Inventor:
Edward Colbert
By Joseph O. Lange Atty.

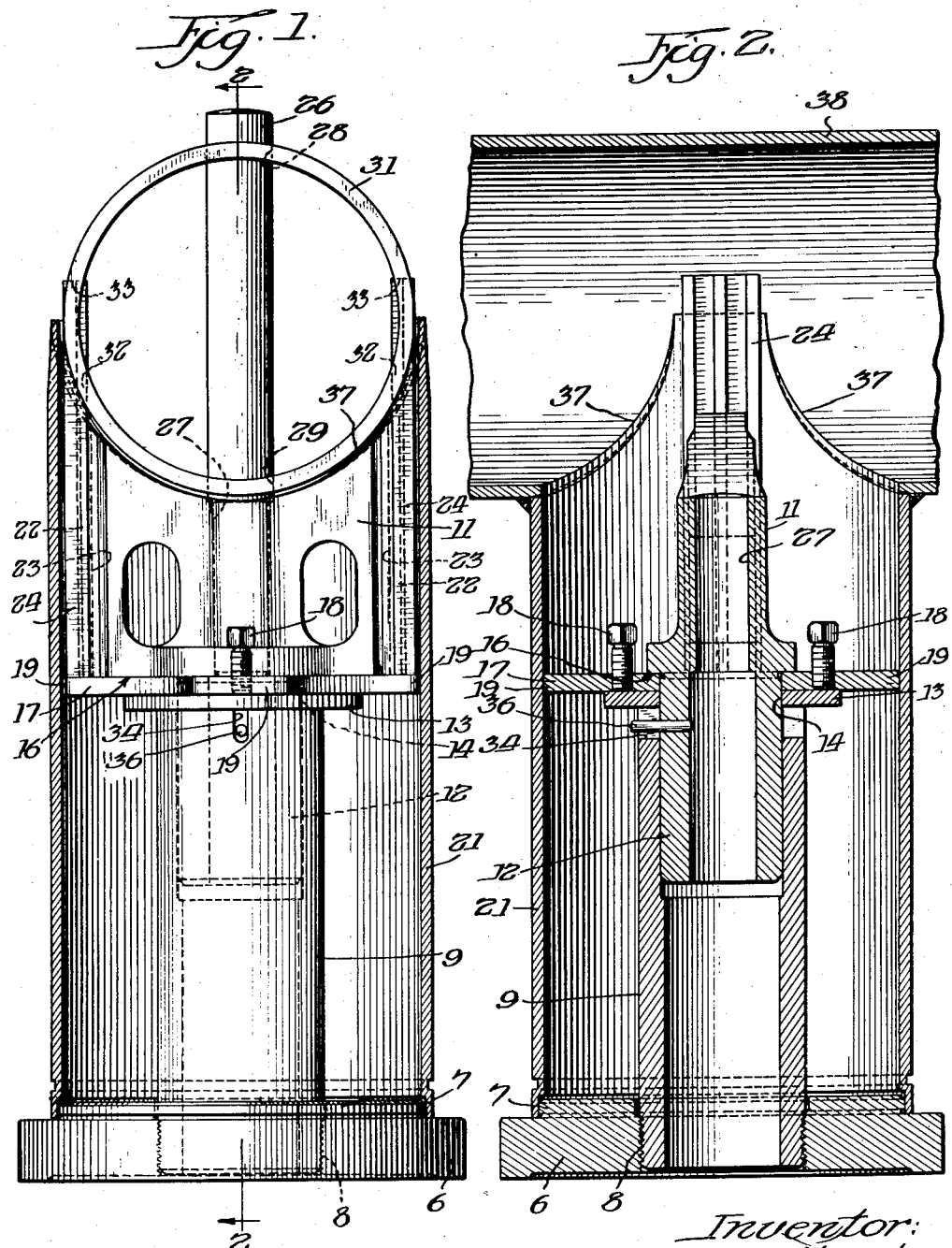

Patented Dec. 2, 1947

2,431,732

UNITED STATES PATENT OFFICE 2,431,732

LOCATING AND WELDING FIXTURE

Edward Colbert, Chicago, Ill., assignor, by mesne assignments, to the United States of America, as represented by the Atomic Energy Commission Application April 17, 1944, Serial No. 531,511

5 Claims. (Cl. 113—99)

1

This invention relates to locating and welding fixtures and is more particularly concerned with a novel fixture of this type adapted for use in first locating accurately and then welding to each other such valve parts as bodies, bonnets, and disc guide members.

This invention contemplates the provision of a combined locating and welding fixture which is relatively simple in construction, reliable in use, and which will not readily get out of order.

This invention further contemplates the provision of means for adjusting the positions of the valve parts with respect to each other in order to insure desired precise alignment thereof prior to welding the same together.

This invention embodies other novel features, details of construction and arrangement of parts which are hereinafter set forth in the specification and the claims and illustrated in the accompanying drawings, forming part thereof, wherein:

Fig. 1 is a side elevational view showing a locating and welding fixture embodying features of this invention, and in which a valve bonnet and disc guide members are shown in their located positions.

Fig. 2 is a sectional view taken along the line 2—2 of Fig. 1, showing the cylindrical alignment member and alignment plug removed and replaced by a valve body.

Figure 3:
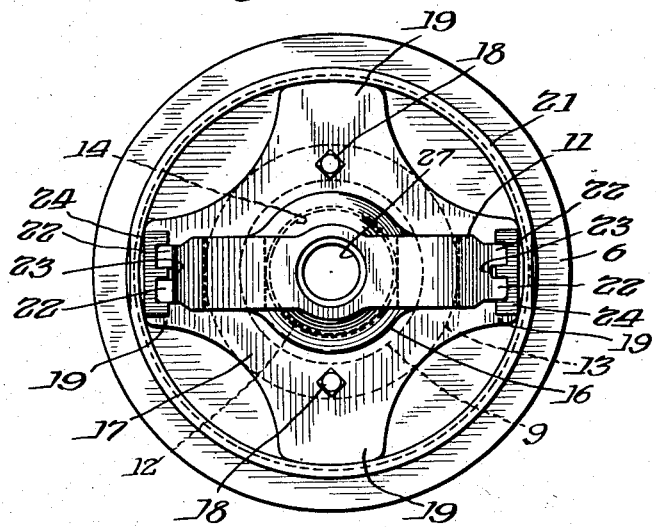
Fig. 3 is a plan view of the fixture and valve parts shown in Fig. 1 with the cylindrical alignment members omitted.
Figure 4:
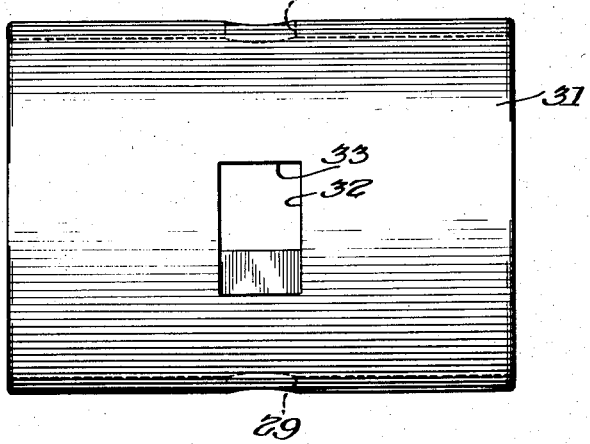
Fig. 4 is a detail side elevational view showing the cylindrical alignment sleeve member.

Referring now to the drawings for a better understanding of this invention, a flat base plate 6 is formed with a bonnet alignment shoulder 7 and a threaded aperture 8 to receive the threaded end of a sleeve 9. A disc guide retainer 11 is formed with a plug end portion 12 for snug sliding engagement in the upper end of the sleeve 9. A thrust plate 13 having an aperture 14 to loosely receive the plug portion 12 is disposed for engagement against the upper end of the sleeve 9. Interposed between a shoulder 16 formed on the retainer 11 and the thrust plate 13 is provided an adjustment plate 17 having threaded apertures to receive adjustment screws 18. A plurality of bonnet alignment fingers 19 are preferably formed on the adjustment plate 17 for engagement with the inner wall of a valve bonnet 21. The adjustment plate 17 is press fitted onto the plug portion 12 to prevent movement relative thereto.

2

Tongues 22 and grooves 23 are formed on diametrically opposed sides of the retainer 11 and disposed in parallel vertical alignment for engagement with a pair of valve disc guide members 24. An aligning plug 26 is mounted in a centrally disposed opening 27 formed in the retainer 11 for engagement in apertures 28 and 29 provided in a cylindrical alignment sleeve member 31. The sides of the member 31 are preferably slotted at 32 to receive the upper ends of the disc guide members 24, the latter being adapted to engage against the shoulders 33 of the slots. A slot 34 is formed in the upper end of the sleeve 9 to coact with a pin 36 mounted on the plug end 12 to prevent rotational movement of the disc guide retainer 11.

In the use of the fixture thus described the bonnet 21 is mounted on the base plate 6 and held against radial displacement by means of the alignment shoulder 7 and the adjustment plate 17. The disc guide members 24 are then inserted between the retainer 11 and the inner wall of the bonnet 21 and held against misalignment by means of the tongues 22. The cylindrical alignment member 31 is next positioned on the plug 26, and with the upper ends of the guide members 24 disposed in the slots 32. The bonnet 21 is then rotated until the alignment member 31 fits snugly against the walls of the recesses 37 formed in the bonnet, and at the same time causing the upper ends of the guide members 24 to contact the shoulders 33 of the slots 32. The adjustment screws 18 are provided in order to adjust the vertical positions of the guide members 24. After the disc guide members 24 are thus positioned with relation to the bonnet 21, the cylindrical alignment member 31 and the plug 26 are then removed and replaced by a valve body 38 engaging the upper surfaces 37 of the annular walls of the bonnet 21. The valve body 38, bonnet 21, and disc guide members 24 are then suitably tack-welded to each other to form an integral structure. Preferably they are later removed from the fixture for the final welding operation to form a leakproof, pressure-tight connection therebetween, thus completing the assembly.

By means of the novel fixture thus described, it is apparent that valve bodies, bonnets and disc guide members may be quickly and accurately positioned with relation to each other, and are then welded together to form an integral valve structure having the disc guide members disposed in axial alignment with the bonnet and at right angles to the longitudinal axis of the valve body.

While this invention has been shown in but one form it is obvious to those skilled in the art that it is not so limited but is susceptible to various changes and modifications without departing from the spirit thereof or the scope of the appended claims.

I claim:

1. In a fixture for locating a pair of parallel guide members adjacent the inner wall of a bonnet, a base, bonnet engaging means provided on said base, oppositely disposed projecting means provided on said bonnet engaging means for engagement with said guide members to locate same radially and longitudinally with respect to each other and the inner wall of the bonnet, adjusting means therefor, and a cylindrical alignment sleeve cooperating with said adjusting means for locating the guide members vertically relative to the said bonnet.

2. In a fixture for locating a pair of parallel guide members adjacent the inner wall of a bonnet, a base, bonnet engaging means provided on said base, means provided on said bonnet engaging means for engagement with said guide members to locate same radially and longitudinally with respect to each other and the inner wall of the bonnet, and a cylindrical alignment sleeve for locating the guide members relative to the said bonnet, said cylindrical alignment sleeve being suitably formed for engagement with said bonnet and having slots formed in the sides thereof to receive the upper ends of the said guide members.

3. In a fixture of the type described, comprising bonnet alignment means for engagement with the wall of a bonnet, guide member engaging means disposed in parallel axial alignment with said bonnet alignment means, and means for adjusting the position of the guide member engaging means arcuately relative to the said bonnet alignment means.

4. In a fixture of the type described, comprising bonnet alignment means for engagement with the inner wall of a bonnet, guide member engaging means disposed in parallel axial alignment with said bonnet alignment means, an alignment member for determining the proper arcuate position of the guide member engaging means, and means for longitudinally adjusting the position of the guide member engaging means relative to the said bonnet alignment means.

5. In a fixture of the type described, comprising bonnet alignment means for engagement with the inner wall of a bonnet, guide member engaging means disposed in parallel axial alignment with said bonnet alignment means, an alignment member for determining the desired arcuate and longitudinal position of the guide member engaging means, and means for longitudinally adjusting the position of the guide member engaging means relative to the said bonnet alignment means.

EDWARD COLBERT.

REFERENCES CITED

The following references are of record in the file of this patent:

UNITED STATES PATENTS

| Number | Name | Date |
| --- | --- | --- |
| 2,323,039 | Hill | June 29, 1943 |
| 2,353,868 | Bisbee et al. | July 18, 1944 |
| 1,659,676 | Vincent | Feb. 21, 1928 |
| 2,080,906 | Boyer | May 18, 1937 |
| 1,879,122 | Davis | Sept. 27, 1932 |
| 1,679,324 | Murray | July 31, 1928 |
| 1,557,926 | Dopp | Oct. 20, 1925 |
| 2,054,445 | Plant | Sept. 15, 1936 |
| 914,743 | McDonald | Mar. 9, 1909 |